(12) United States Patent
Chapman et al.

(10) Patent No.: US 11,789,187 B2
(45) Date of Patent: Oct. 17, 2023

(54) METHOD FOR PRODUCING A MULTILAYER LAUE LENS

(71) Applicant: Deutsches Elektronen-Synchrotron DESY, Hamburg (DE)

(72) Inventors: Henry Chapman, Hamburg (DE); Sasa Bajt, Hamburg (DE); Mauro Prasciolu, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 78 days.

(21) Appl. No.: 17/453,433

(22) Filed: Nov. 3, 2021

(65) Prior Publication Data
US 2022/0146721 A1    May 12, 2022

(30) Foreign Application Priority Data

Nov. 6, 2020 (EP) .................................... 20206299

(51) Int. Cl.
*G02B 5/18* (2006.01)
*G21K 1/06* (2006.01)

(52) U.S. Cl.
CPC ............. *G02B 5/188* (2013.01); *G21K 1/062* (2013.01); *G21K 2201/061* (2013.01)

(58) Field of Classification Search
CPC .......... G02B 5/188; G02B 1/00; G02B 1/002; G02B 1/10; G02B 5/18; G02B 2005/1804; G02B 5/1809; G02B 5/1828; G02B 5/1838; G02B 5/1847; G02B 5/1857; G02B 5/1866; G02B 5/1876; G21K 1/062; G21K 2201/061; G21K 2201/064; G21K 2201/067; G21K 2201/068; G21K 1/06
USPC ....... 359/565, 558, 566, 569, 573, 574, 575, 359/576
See application file for complete search history.

(56) References Cited

U.S. PATENT DOCUMENTS

| | | |
|---|---|---|
| 5,257,132 A | 10/1993 | Ceglio et al. |
| 9,366,786 B2 * | 6/2016 | Je .................... C23C 16/45555 |
| 2008/0137810 A1 * | 6/2008 | Liu ...................... G21K 1/062 378/84 |

OTHER PUBLICATIONS

"European Application No. 20206299.8, Extended European Search Report dated Apr. 15, 2021", (dated Apr. 15, 2021), 5 pgs.

(Continued)

*Primary Examiner* — Arnel C Lavarias
(74) *Attorney, Agent, or Firm* — Schwegman Lundberg & Woessner, P.A.

(57) ABSTRACT

A multilayer Laue lens (MLL) that can be operated over a large range of wavelengths which is achieved by providing a lens blank comprising a substrate element extending in a plane defined by orthogonal axes x, y, z, with a layered structure deposited on the upper surface with at least two different materials that are layered upon one another in an alternating manner, wherein the y-extension of the layered structure is constant along the x-axis and varies along the z-axis within a ramp section where the y-extension of the layered structure increases from a starting point, where first particles of material of the layered structure are deposited on the upper surface of the substrate element, to a saturation point, where a maximum y-extension of the layered structure is reached; and slicing a lens out of the lens blank.

24 Claims, 6 Drawing Sheets

(56) References Cited

OTHER PUBLICATIONS

Figure 2:
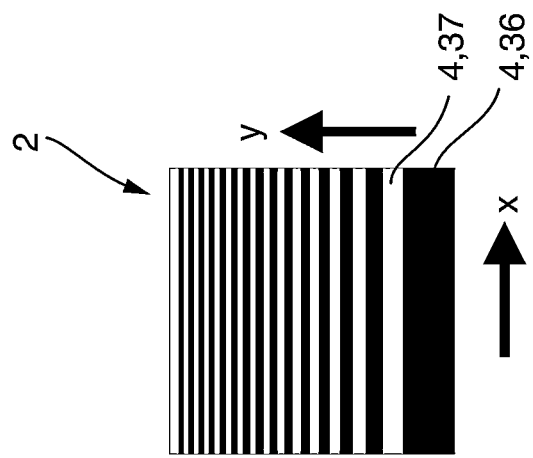

Prasciolu, M., et al., "Fabrication of wedged multilayer Laue lenses", Optical Materials Express, vol. 5, No. 4, Apr. 1, 2015, p. 748, (Mar. 12, 2015), 748-755.

* cited by examiner

METHOD FOR PRODUCING A MULTILAYER LAUE LENS

CROSS-REFERENCE TO RELATED APPLICATIONS

This Non-provisional application claims priority under 35 U.S.C. § 119(a) to European Patent Application No. 20206299.8, filed on 6 Nov. 2020, the entire contents of which are hereby incorporated by reference in its entirety.

The present invention relates to a method for producing a multilayer Laue lens. Further aspects of the invention relate to a multilayer Laue lens produced or producible by such a method, as well as a multilayer Laue lens arrangement including such a multilayer Laue lens, and a method for operating such a multilayer Laue lens arrangement.

Multilayer Laue lenses (MLL) can be used e.g. in X-ray microscopy to achieve high resolution imaging in the nanometre regime. Modern particle accelerators provide ultrabright and high-quality X-ray beams. The short wavelength and the penetrating nature of X-rays are ideal for the microscopic investigation of complex materials. However, taking full advantage of these properties requires highly efficient and almost perfect optics in the X-ray regime. Despite extensive efforts worldwide this turned out to be very difficult, and achieving an X-ray microscope that can resolve features smaller than 10 nm is still a big challenge.

Due to their unique properties X-rays cannot be focused as easily as visible light. One way is to use specialised X-ray optics: the multilayer Laue lenses (MLLs). These lenses consist of alternating layers of two different materials with nanometre thickness. They are prepared with a coating process called sputter deposition. In contrast to conventional optics, MLLs do not refract light but work by diffracting the incident X-rays in a way that concentrates the beam on a small spot. To achieve this, the layer thickness of the materials has to be precisely controlled. The layers must gradually change in thickness and orientation throughout the lens. The focus size is proportional to the smallest layer thickness in the MLL structure.

MLLs are diffractive optics for focusing X-rays, made by depositing structures layer by layer and then slicing out a lens. X-rays that transmit through the lens can be diffracted by the layered structure. As with any diffractive focusing optic (such as a zone plate), the period of the layers must decrease with distance of the layers from the optic axis, so that rays are diffracted by larger angles in such a way that they converge on a common point. The resolution of the lens is inversely proportional to the numerical aperture and proportional to the wavelength, and is thus also proportional to the smallest period in the lens structure. With optimised layer deposition, it should be possible to achieve layer periods approaching 1 nm, and thus also resolutions approaching 1 nm. For hard X-rays of energies greater than about 8 keV, efficient diffraction requires that the structure has a thickness t that is several micrometers thick in the direction of the beam propagation, so the aspect ratio (length to height) of the layers can be several thousand. As a result, diffraction only efficiently occurs when the layers are oriented in the Bragg condition, set by the equation $$\lambda = 2d \sin \theta \quad (1)$$

where $\lambda$ is the wavelength, d is the layer period at a particular position in the lens and $\theta$ is the angle of incidence of the ray to the plane of the layers (the diffracted ray is deflected by $2\theta$). However, there is a range of angles over which diffraction can occur. This range is known as the rocking-curve width or the Darwin width. For multilayer structures of periods of several nanometers, this width is usually considerably less than 1 mrad. This means that if the layers of the lens are all parallel to each other, there will only be a limited range of diffraction angles $2\theta$ that can reflect from the lens, and the numerical aperture of the lens will thus be limited, preventing high resolution to be achieved. To overcome this, it has been known that the layers must be tilted such that the planes of the layers converge at a point that is twice the focal length from the lens. Such lenses with tilted layers, known as "wedged" MLLs can be fabricated by placing a straight edge above the substrate on which the layers are deposited, as described e.g. in M. Prasciolu, A. F. G. Leontowich, J. Krzywinski, A. Andrejczuk, H. N. Chapman, and S. Bajt. *Fabrication of wedged multilayer Laue lenses. Opt. Mater. Express*, 5(4):748-755, April 2015. The edge casts a "shadow" which modifies the rate at which material accumulates.

Wedged MLLs are often fabricated by depositing the structure onto a flat substrate. This produces a lens that only focuses in one dimension, like a cylindrical lens. Two-dimensional focusing is achieved by using two such lenses oriented so that they focus in orthogonal directions. The focal length of one must be made slightly shorter than the other so that they can focus to a common point without physically overlapping.

A common size of an MLL is a height of about 100 μm in the y direction, which is usually limited by the ability to deposit layers, as well as by the fact that larger heights correspond to a larger number of layers which then require a narrower bandwidth to operate, limiting the total flux that can be focused. For a wavelength of 0.05 nm, and a resolution of 2 nm, the numerical aperture would be 0.0125 and the focal length would then be 8 mm.

With all diffractive lenses, the focal length is inversely proportional to the wavelength. The tilts of the layers in a wedged MLL, however, are valid only for a particular focal length, since the correct tilt is related geometrically to twice the focal length. This means, that a wedged MLL can only operate at one particular wavelength. However, many applications in X-ray microscopy would benefit from operating over a range of wavelengths. With conventional diffractive optics such as zone plates, this is possible. Of course, the focal length changes with wavelength, so when the wavelength is changed, the lens must be repositioned. This is usually achieved in an X-ray microscope by mounting either the sample or lens on a linear stage that is programmed to move when the wavelength is changed. Obviously, this scheme does not work with a wedged MLL since it only operates at a single wavelength.

Thus, the present subject matter includes a method for producing a wedged MLL that can be operated over a large range of wavelengths, and which preferably requires only a linear stage to adjust the positions of the lens as the wavelength is changed.

It is known that, when creating the wedge of the layers by the shadow of a straight edge, the gradient of the profile varies along the profile and hence lenses with different focal lengths can be obtained by slicing the lenses at different positions along the profile. The inventors have found that the profile from a straight edge usually produces a profile of the height, i.e. the y-extension, of the layered structure that varies, along the z-axis, as an error function. Compared with the layer heights that would be obtained without the mask edge, the heights are multiplied by a factor h(z), according to $$h(z) = \tfrac{1}{2}(1 + \operatorname{erf}(z/w)) \quad (2)$$

where z is the coordinate along the substrate that is also taken to be along the beam propagation direction, and w is a width which depends on the distance of the mask to the substrate and properties of the sputtering targets. The focal length, f, for a particular wedge gradient is such that the layers of the lens, when extended as straight lines, would intersect the optic axis at a distance 2f from the lens. This requires that $$f(z) = \frac{h(z)}{2h'(z)} = \frac{\sqrt{\pi}w}{4}\exp(z^2/w^2)(1 + \mathrm{erf}(z/w)) \quad (3)$$

Here, h'(z) is the derivative of h with respect to z.

There is one other aspect to consider, which is that lenses cut from the shadowed region with a particular height factor h(z) have modified diffractive properties compared with the unshadowed structure, since the layer periods and positions are likewise scaled. In particular, the focal length due to diffraction is scaled by $h^2(z)$ and thus the focal length for a particular wavelength is given by $$f(z) = \frac{\lambda_o f_o}{\lambda} h^2(z) \quad (4)$$

where $\lambda_o$ and $f_o$ are the wavelength and focal length of the unshadowed structure, considered as design parameters. That is for a given cut at a position z of the profile, Eqn. (3) specifies the focal length, and Eqn. (4) can then be solved to determine the operating wavelength.

The deposition of the multilayer structure is to be made on a substrate that is many centimeters in diameter. The inventors consider the coordinates (x, z) in the plane of the substrate with z along the direction of the profile and the optic axis, and x perpendicular to that. A single lens cut from the substrate would only require cutting from this a width, in x, of about 100 μm and a length, in z, of tens of μm. However, in this invention, a very wide structure is cut that spans a large range in x and with a variation of the coordinate z with the position x. The thickness of this structure in the z direction is the same as needed for the single lens. Thus, the structure is a wide strip that is cut from the substrate, but it is not necessarily cut in a straight line. In use, the strip would be positioned so that the beam (of about 100 μm×100 μm) illuminates just a patch. The particular patch is chosen such that the focal length as determined by the gradient in Eqn. (3) matches the focal length due to diffraction as dependent on the particular wavelength. When the wavelength of the beam is changed, then the structure is moved accordingly to a different x position where the z coordinate provides the required focal length.

It can be noted that when the wavelength is changed the lens structure must be moved in x to select the part of the structure with the correct gradient and also must be moved in z to refocus the lens onto the sample. In one embodiment of the invention, this complex motion can be constrained to a linear motion by choosing the path of the cut of the strip from the deposited structure. Then, the wavelength selection and refocusing can be accomplished with a single linear motion that is provided by a linear motorised stage, for example. The path of the cut by noting that as the z coordinate of the cut increases, the focal length, given by Eqn. (3), also increases. The position of the focus for a cut made at $z_c$ is therefore at a position $$z = z_c - f(z_c) \quad (5)$$

(in the coordinate system of the profile and the strip). In order to maintain a linear motion, the x coordinate on the strip for a particular position $z_c$ should be set such that $$x = (z_c - f(z_c))g \quad (6)$$

where g is a constant.

The range of wavelengths that can be addressed is limited to where the value of h becomes too small (so that the lens is of a small height and the layers thinner than lengthscales of materials interdiffusing) and where h approaches one and there is no gradient. However, for an appropriate choice of parameters, it is very straightforward to address range where the wavelength doubles.

For focusing in two dimensions, two such strips are required, oriented in orthogonal directions to each other. These must be cut from two distinct structures where one or more of the parameters $\lambda_o$, $f_o$, or w are changed. The lens strip which gives the longer focal length for a given energy is placed upstream, i.e. further from the focus. Given profiles of the kind specified by Eqn. (3), if the focal length is greater for one lens structure than the other at a given wavelength, then it will be greater for all wavelengths.

It should be pointed out that the optimum thickness t in the direction of beam propagation z to achieve maximum efficiency of an MLL depends on the wavelength, as given by dynamical diffraction theory. Generally, the shorter the wavelength, the thicker the lens. Thus, ideally, the extended lens structure would be cut such that its thickness changes along the x coordinate to maintain maximum focusing efficiency across the entire structure.

According to the invention a method for producing a wedged MLL is provided, wherein the method comprises the following steps: As a first step, a lens blank is provided comprising a substrate element and a layered structure. The substrate element is preferably plate-shaped and made of a material such as silicon or glass, chosen for its ability to be highly polished. The substrate element has a flat and smooth upper surface extending in a plane defined by orthogonal axes x, y, z, wherein x and z extend in the plane and y extends normal to the plane. The layered structure is deposited on the upper surface of the substrate element in such a way that at least two different materials, i.e. a first material such as silicon carbide and a second material such as tungsten carbide, are layered upon one another in an alternating manner. The y-extension, i.e. the thickness, of the layered structure is constant along at least essential parts of the x-axis and varies along the z-axis within a ramp section where the y-extension of the layered structure increases from a starting point, where first particles of material of the layered structure are deposited on the upper surface of the substrate element, to a saturation point, where a maximum and constant y-extension of the layered structure is reached. As a second step, a lens is sliced out of the lens blank by slicing through the ramp section, preferably in parallel to the y-axis, but not parallel, in particular angled or curved, to the x- and z-axes. I.e., the z-position of the slice changes along the x-axis. The slice is usually parallel to the y-axis. However, the slice might also be cut at an angle that is not parallel to the y-axis. This might be the case e.g. to compensate for errors in the deposition of the layered structure. Slicing in this connection preferably requires cutting of a slice, preferably having much greater extension in the cut plane as in the thickness direction between cut planes.

By such a method a wedged MLL can be produced in a simple way, which can be used with a broad bandwidth of different wavelengths of X-rays by merely adjusting the position of the MLL in the x-z-plane. This can be done by a simple linear movement if the MLL is suitably cut. Providing multiple MLLs for different X-ray wavelengths and complicated rebuilding and calibrating every time a wavelength is changed can be avoided.

According to a preferred embodiment, wherein the lens is sliced out of the lens blank by producing at least a first cut and a second cut opposite and spaced from the first cut. Preferably, both cuts are parallel to the y-axis but not parallel to the x- and z-axes. The lens is then extracted between both cuts.

According to another preferred embodiment, the thickness of the sliced lens, i.e. the distance between the first and the second cut, is constant. A constant thickness MLL might be advantageous in some cases.

According to an alternative embodiment, the thickness of the sliced lens varies in the x-z-plane, preferably along the x-axis. In such a way, a maximum focusing efficiency is maintained across the entire lens, as explained further above.

According to a further preferred embodiment, the sliced lens has a straight extension in the x-z-plane. A straight lens might be advantageous in some cases.

According to an alternative embodiment, the sliced lens has a curved extension in the x-z-plane. By a suitably curved lens adjusting the lens to a new wavelength of the X-ray and corresponding refocusing can be done by a single linear movement of the lens.

According to a preferred embodiment, the x-z-extension of the sliced lens is adapted such that, when the lens is positioned in an X-ray beam of a certain wavelength and the wavelength is altered subsequently, over a wide bandwidth both adjustment of the lens to the new wavelength and corresponding refocusing can be carried out simultaneously by a linear movement of the lens along a single straight line in the x-z-plane. For this the x-z-extension of the lens is preferably curved. In such a way, the fixing device for the MLL can be greatly simplified and complicated rebuilding and calibrating every time a wavelength is changed can be avoided.

According to another preferred embodiment, the lens blank is produced by a sputter deposition method. This relates to a very precise and reliable procedure for producing an MLL blank.

In particular, it is preferred that the sputter deposition method comprises the following steps: First, the substrate element is provided arranged with a flat, preferably clean and smooth, upper surface preferably oriented upwards. Further, a particle source, preferably a sputter target, is positioned opposite the upper surface of the substrate element, spaced from the upper surface in z-direction. Also, a mask element is positioned between the upper surface of the substrate element and the particle source, such that a straight edge of the mask element extends in parallel to the x-axis and spaced between the upper surface and the particle source along the y-axis. Then, particles of at least two different materials are deposited in an alternating manner, such that the deposited particles form a layered structure on the upper surface of the substrate element formed by the at least two different materials layered upon one another in an alternating manner. By such a sputter deposition method an advantageous precisely defined layer deposition and layered structure profile can be achieve.

It is further preferred that the mask element is positioned in such a way that it partly blocks deposition of the particles from the particle source onto the upper surface of the substrate element, so that along the z-direction of the upper surface the mask causes a full shadow area where no particles are deposited, followed by a penumbra area where a limited amount of particles is deposited thereby forming the ramp section of the layered structure, followed by a full deposition area where a full amount of particles is deposited thereby forming a section of maximum and constant y-extension, i.e. full thickness, of the layered structure. Due to the straight edge of the mask element in parallel to the x-axis the amount of deposited particles, and thus the y-extension of the layered structure, is essentially constant along the x-axis. At the same time, the penumbra area allows that the particles are deposited in a ramp-shape along the ramp section, which in turn allows an MLL with wedged layers to be cut out.

According to a preferred embodiment, the y-extension of the layered structure within the ramp section increases in the form of an error function. This is particularly the case due to the straight edge mask sputter deposition. Such an error function-shaped ramp section is advantageous as the inclination of the layers change in z-direction, so that, depending on the z-position of the slice, different wedge angles are available, i.e. MLLs with different wedge angles can be sliced out or a single MLL with varying wedge angles of the layers along the x-coordinate can be sliced out, as intended in the present invention. The y-extension or height of the layered structure in the error function-shaped ramp section can be calculated as stated above under Eqn. (2).

According to another preferred embodiment, the lens is formed in such a way that the focal length for a particular wedge gradient of a particular layer at a particular x-coordinate is such that the layers of the lens, when extended as straight lines, would intersect the optic axis at a distance of twice the focal length from the lens. This allows to calculate the focal length as noted above under Eqn. (3).

A further aspect of the present invention relates to a multilayer Laue lens produced or producible by the method according to any of the embodiments explained above. Features and effects mentioned above in connection with the method for producing an MLL apply vis-A-vis also with respect to the MLL itself.

A further aspect of the present invention relates to a multilayer Laue lens arrangement comprising the multilayer Laue lens as defined before, and a fixing device for fixing the multilayer Laue lens relative to an X-ray beam. The fixing device is formed such that the position of the multilayer Laue lens can be adjusted along a linear track, preferably only along a linear track, in the x-z-plane of the lens coordinate system corresponding to the coordinate system of the substrate element before slicing out the lens. The MLL arrangement might comprise a second MLL fixed by the same or by another fixing device with an orthogonal orientation with respect to the first MLL and preferably adjustable along a second linear track orthogonal with respect to the first linear track. Features and effects mentioned above in connection with the MLL apply vis-á-vis also with respect to the MLL arrangement.

A further aspect of the present invention relates to a method for operating the multilayer Laue lens arrangement as described before. The method comprises the following steps: First, the multilayer Laue lens arrangement is arranged relative to an X-ray beam of a certain wavelength such that the multilayer Laue lens is positioned in the X-ray beam. Then, the wavelength of the X-ray beam is altered, preferably within a wide bandwidth of possible wavelengths. Subsequently, the lens is adjusted to the altered wavelength and simultaneously is correspondingly refocusing by a single linear movement of the lens along the linear track. Features and effects mentioned above in connection with the MLL arrangement apply vis-á-vis also with respect to the method for operating the MLL arrangement.

Preferred embodiments of the invention are described hereinafter in more detail by means of a drawing. The drawing shows in FIG. 1 a schematic view of a cross section in the y-z-plane of a lens blank and a lens as cut out from the lens blank, FIG. 2 a schematic view in the x-y-plane of a lens cut in parallel to the x-axis as known from the prior, FIG. 3 a schematic view in the x-y-plane of two lenses cut in parallel to the x-axis according to the invention and arranged orthogonally in the x-y-plane, FIG. 4 a schematic perspective view of the two orthogonal lenses shown in FIG. 3, FIG. 5 a schematic view of the lens blank shown in FIG. 1 from the top showing the paths of the lens cut and the focus in the x-z-plane, FIG. 6 a diagram of the height of the layered structure along the z-axis as well as the corresponding wavelength and focal length, FIGS. 7-9 diagrams of the form of the lens cut in the lens blank and the corresponding wavelength, and FIG. 10 a schematic side view of a sputter process for producing a lens blank using a mask element with a straight edge.

Figure 1:
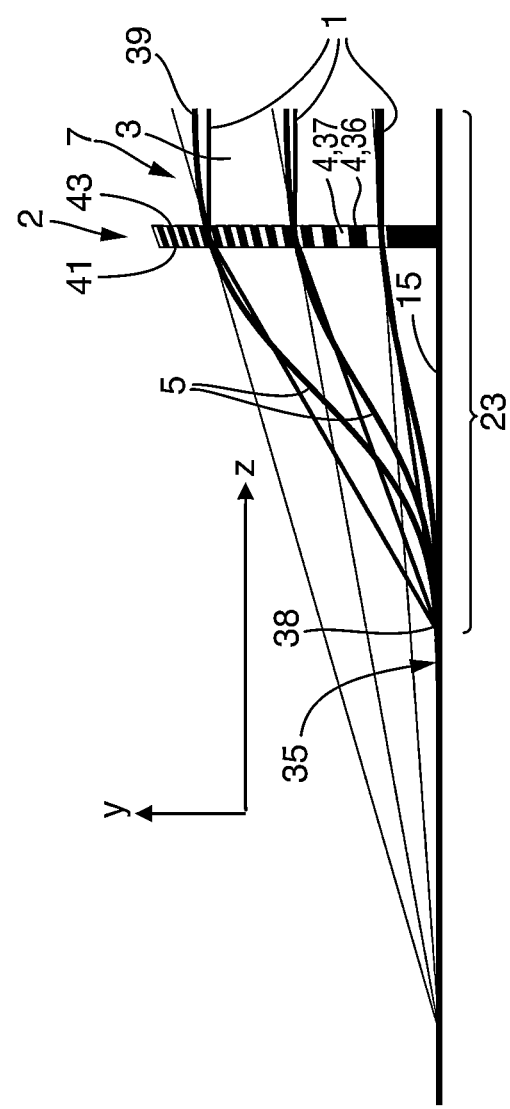
Figure 3:
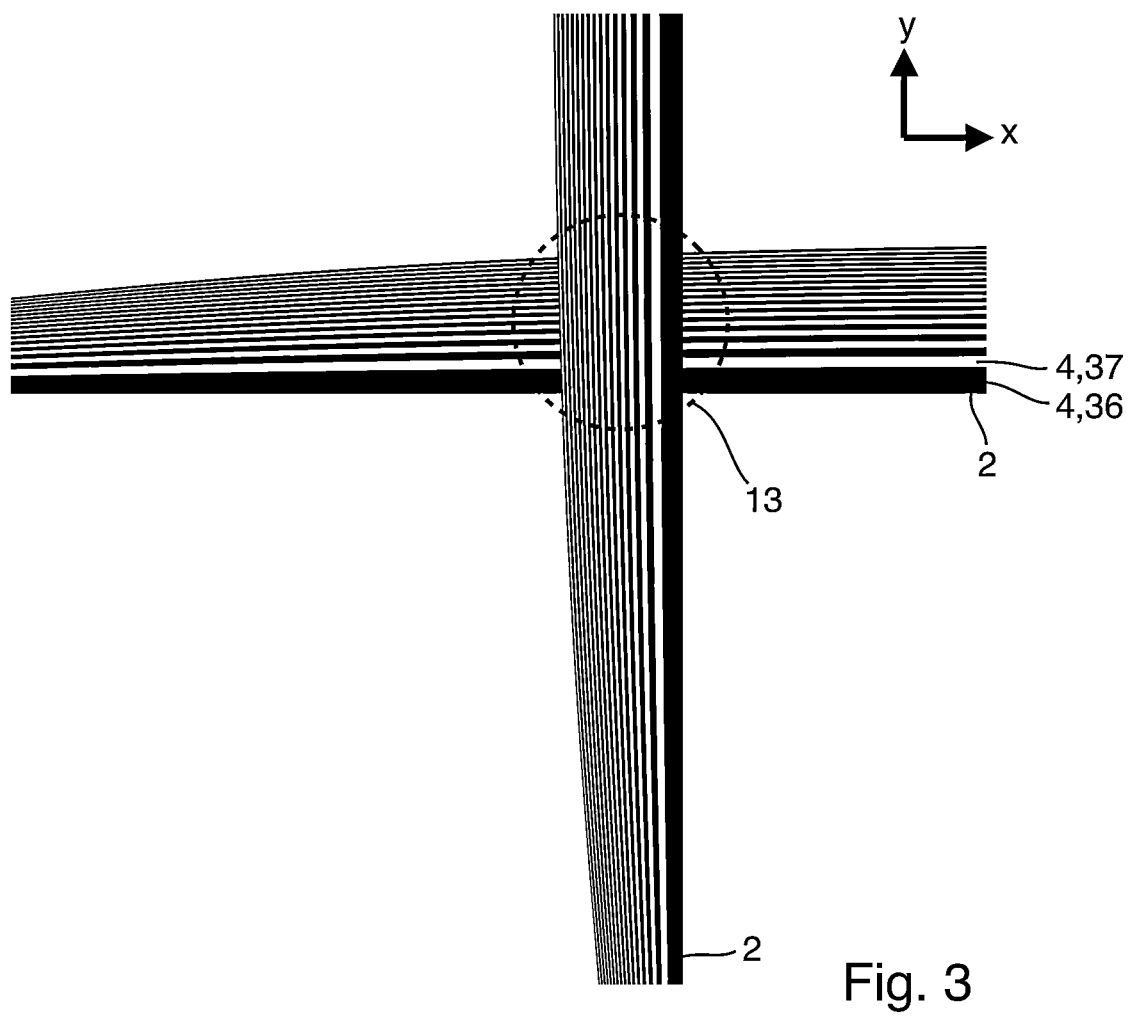
Figure 4:
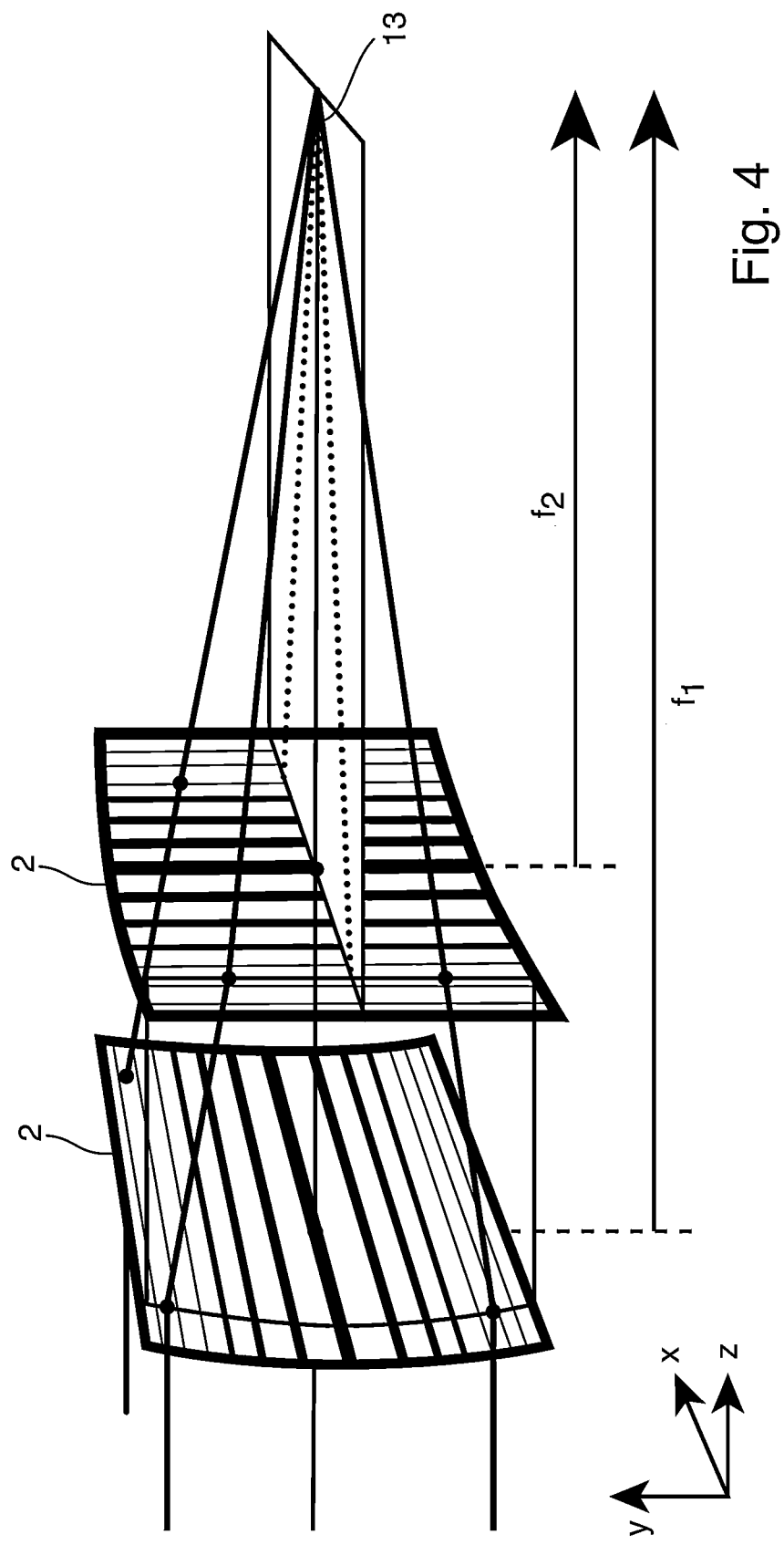

In FIG. 1 a schematic showing the focusing of rays impinging from the right (indicated by references 1) by a wedged multilayer Laue lens (MLL) 2 cut from a lens blank 3 with layers 4 that follow the profiles indicated by reference 5. FIGS. 2 and 3 show schematics of lenses 2 viewing the x-y plane. FIG. 2 shows how a lens 2 is cut according to the prior art, with a square shape. It would be cut at just one z-position, and so would be used only at one wavelength. FIG. 3 shows how two long lenses 2 according to the invention would look when viewing down the z-axis. These lenses 2 are cut from the deposited layered structure 7 of the lens blank 3 along a line that is inclined in the x-z-plane and so the height changes in x due to the gradient of the deposited layered structure 7 profile in the z-direction. Two lenses 2 are shown—one is rotated by 90° in the x-y-plane so that it focuses in the orthogonal direction. One of the lenses 2 will have to be closer to the focus as the other since they cannot occupy the same space, which means that the lenses 2 must be cut from different layered structures 7 made with slightly different shadow widths. FIG. 4 schematically shows how the two crossed lenses 2 focus in two dimensions. The dashed circle in FIG. 3 and the continuous lines in FIG. 4 show the incident X-ray beam 13. When the wavelength of the beam 13 is changed then the lenses 2 must both be moved along their widths and in z to illuminate the appropriate region of each lens 2.

Figure 5:
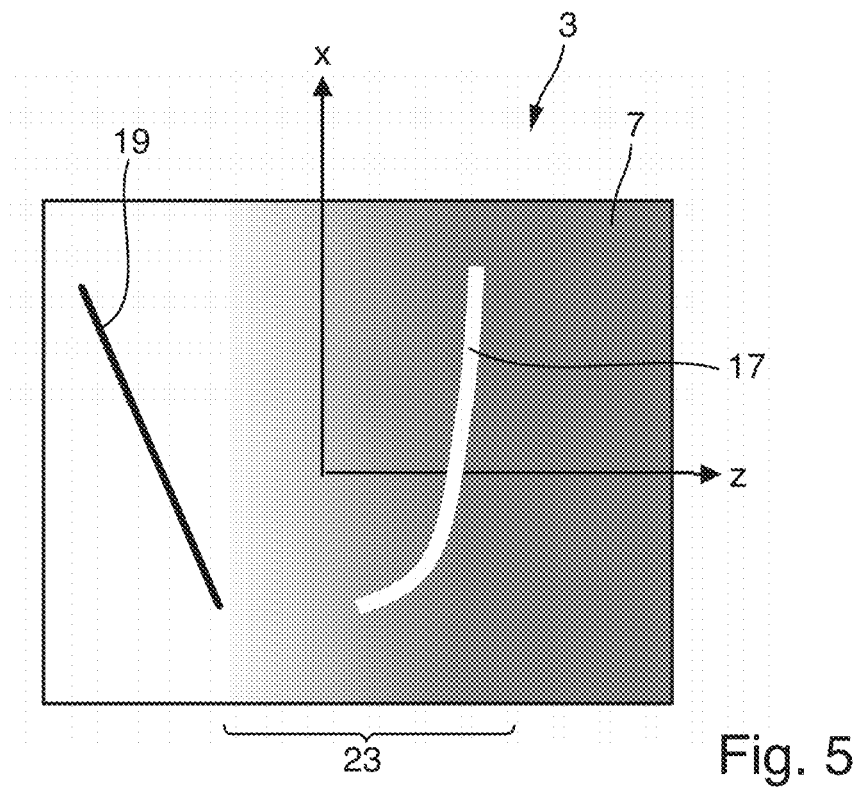

FIG. 5 illustrates coordinates x-z of the substrate element 15 showing the profile of the deposited layered structure 7 as the grey gradient, and the cut of the lens 2 as the white line 17. The straight grey line 19 is the position of the focus for different wavelengths and their corresponding positions in the lens 2, and this represents the linear motion required of the lens 2 when changing wavelengths to keep the sample in focus. It is apparent that many lenses 2 can be cut from a single lens blank 3 by translating the path, i.e. the white line, along the x-coordinate.

Figure 6:
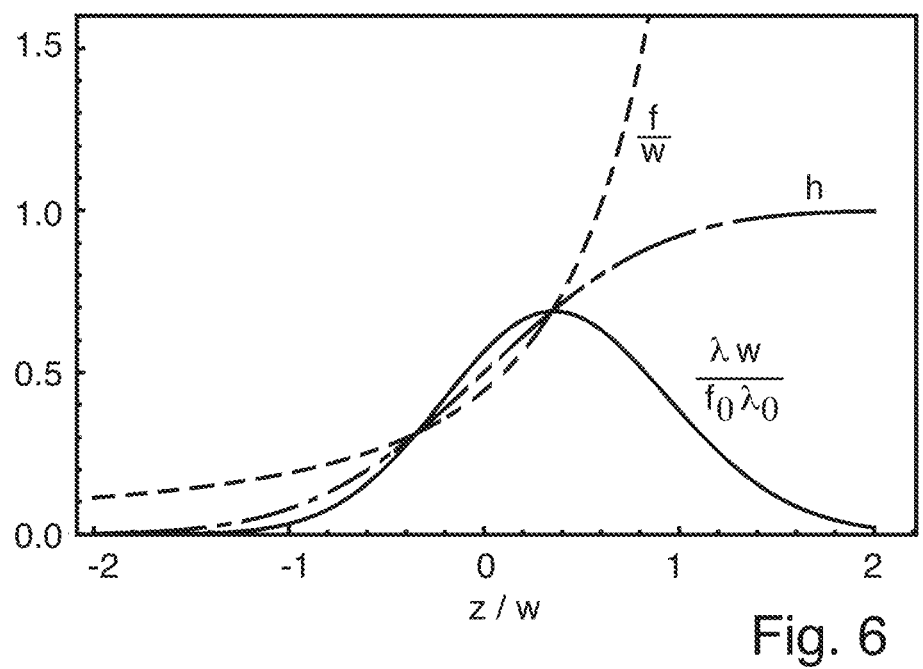
Figure 7:
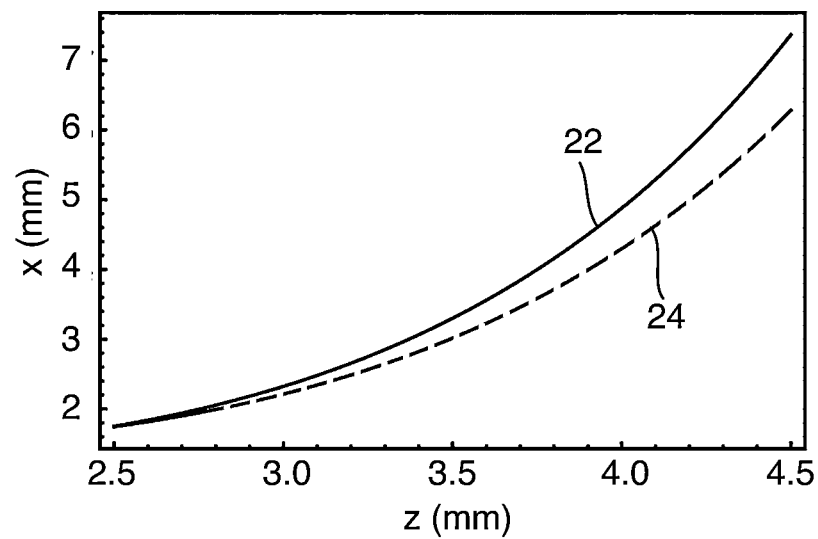
Figure 8:
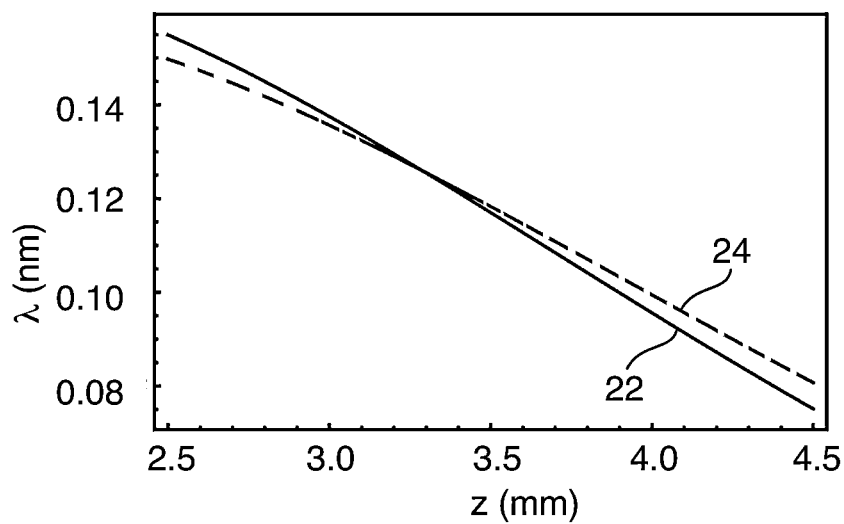
Figure 9:
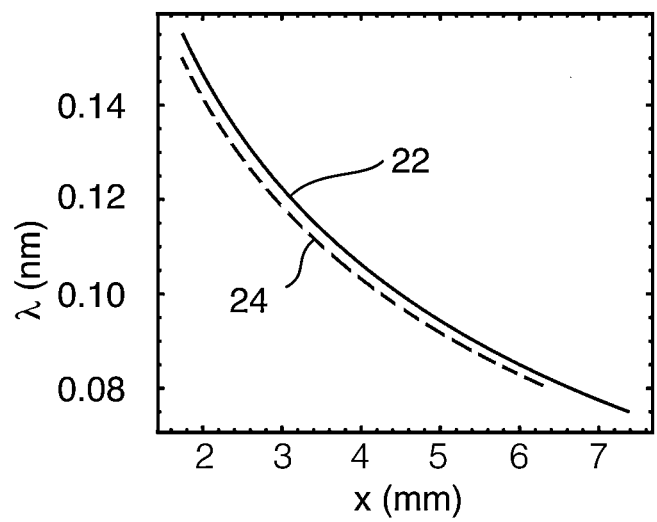

FIG. 6 shows a plot of the profile h, i.e. the y-extension, along a ramp section 23 of the layered structure 7 of the lens blank 3, as a function of the normalised position z/w along the gradient, as well as the corresponding focal length f shown in units of the width of the shadow w, and the wavelength λ normalised by $\lambda_o f_o/w$. FIGS. 7-9 illustrate an example of a pair of lenses 2 obtained by deposition with profiles of w=4 mm (reference 22) and w=4.25 mm (reference 24). FIG. 7 shows a plot of the curve of the cut made on the substrate element 15 to ensure that the position of the focal length follows a straight line according to Eqn. (6) with g=1. Further shown are plots of the corresponding wavelengths λ obtained for the given z-coordinates (FIG. 8) and y-coordinates (FIG. 9). The wavelength spans almost an octave, i.e. a factor of two.

Figure 10:
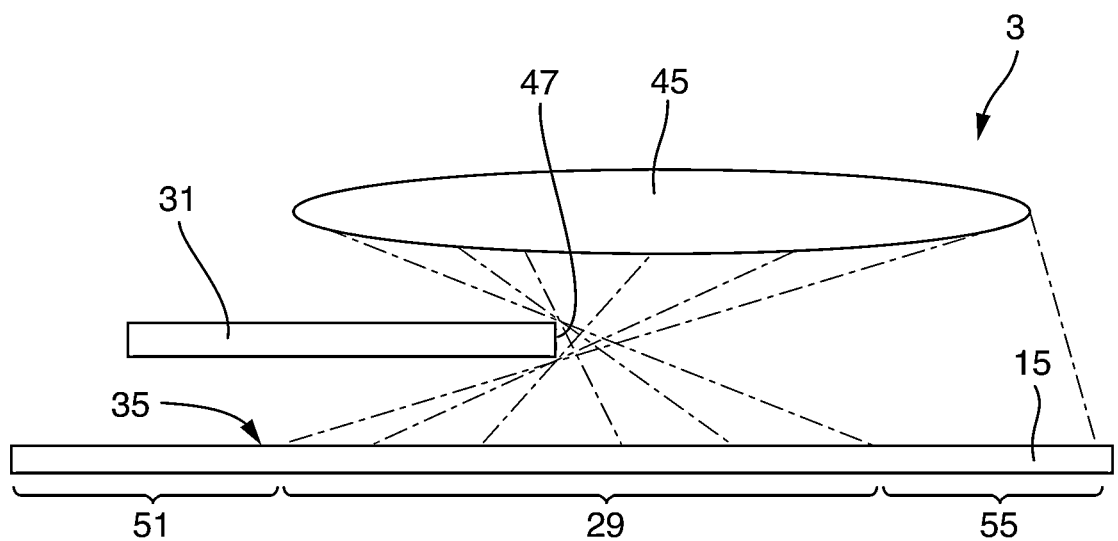

FIG. 10 illustrates how the required curvature of the layered structure 7 in the ramp section 23 of the lens blank 3 is achieved by accumulation of the layers 4 with a gradient in the deposition rate across the substrate element 15, achieved in a penumbra area 29 of a straight edge mask element 31. The distance of the mask element 31 to the substrate element 15 is adjusted to obtain the correct curvature, which results in a penumbra area 29.

According to the present invention, the wedged MLL 2 is produced by carrying out the following steps: First, a lens blank 3 is provided comprising a substrate element 15 and a layered structure 7, as shown in FIG. 1. The substrate element 15 is plate-shaped and made of silicon or glass. The substrate element 15 has a flat and smooth upper surface 35 extending in a plane defined by orthogonal axes x, y, z, wherein x and z extend in the plane and y extends normal to the plane. The layered structure 7 is deposited on the upper surface 35 of the substrate element 15 in such a way that two different materials 36, 37, i.e. a first material 36 and a second material 37, in the present embodiment SiC and WC, are layered upon one another in an alternating manner. The y-extension, i.e. the thickness, of the layered structure 7 is constant along at least essential parts of the x-axis and varies along the z-axis within a ramp section 23 where the y-extension of the layered structure 7 increases from a starting point 38, where first particles of material of the layered structure 7 are deposited on the upper surface 35 of the substrate element 15, to a saturation point 39, where a maximum and constant y-extension of the layered structure 7 is reached. As a second step, a lens 2 is sliced out of the lens blank 3 by slicing through the ramp section 23 in parallel to the y-axis but not parallel, specifically angled or curved, to the x- and z-axes, as shown e.g. in FIGS. 5 and 7.

The lens 2 is sliced out of the lens blank 3 by producing a first cut 41 and a second cut 43 opposite and spaced from the first cut 41. Both cuts 41, 43 are parallel to the y-axis but not parallel to the x- and z-axes. The lens 2 is then extracted between both cuts 41, 43. The thickness of the sliced lens 2 varies in the x-z-plane along the x-axis to maintain a maximum focusing efficiency across the entire lens 2. As shown in FIGS. 5 and 7, the sliced lens 2 has a curved extension in the x-z-plane to be able to adjust the lens 2 to a new wavelength of the X-ray and correspondingly refocus by a single linear movement of the lens 2.

As shown in FIG. 5, the x-z-extension of the sliced lens 2 is adapted such that, when the lens 2 is positioned in an X-ray beam 13 of a certain wavelength and the wavelength is altered subsequently, over a wide bandwidth both adjustment of the lens 2 to the new wavelength and corresponding refocusing can be carried out simultaneously by a linear movement of the lens 2 along a single straight line in the x-z-plane. For this the x-z-extension of the lens 2 is curved in the specific way shown in FIG. 5.

The lens blank 3 is produced by a sputter deposition method, as shown in FIG. 10. The sputter deposition method comprises the following steps: First, the substrate element 15 is provided and arranged with a clean, flat and smooth upper surface 35 oriented upwards. Further, a particle source 45, namely a sputter target, is positioned opposite the upper surface 35 of the substrate element 15, spaced from the upper surface 35 in z-direction. Also, a mask element 31 is positioned between the upper surface 35 of the substrate element 15 and the particle source 45, such that a straight edge 47 of the mask element 31 extends in parallel to the x-axis and spaced between the upper surface 35 and the particle source 45 along the y-axis. Then, particles of two different materials 36, 37 are deposited in an alternating manner, such that the deposited particles form a layered structure 7 on the upper surface 35 of the substrate element 15 formed by the two different materials 36, 37 layered upon one another in an alternating manner.

As also shown in FIG. 10, the mask element 31 is positioned in such a way that it partly blocks deposition of the particles from the particle source 45 on to the upper surface 35 of the substrate element 15, so that along the z-direction of the upper surface 35 the mask 33 causes a full shadow area 51 where no particles are deposited, followed by a penumbra area 29 where a limited amount of particles is deposited thereby forming the ramp section 23 of the layered structure 7, followed by a full deposition area 55 where a full amount of particles is deposited thereby forming a section of maximum and constant y-extension, i.e. full thickness, of the layered structure 7. Due to the straight edge 47 of the mask element 31 in parallel to the x-axis the amount of deposited particles, and thus the y-extension of the layered structure 7, is essentially constant along the x-axis. At the same time, the penumbra area 29 allows that the particles are deposited in a ramp-shape along the ramp section 23, which in turn allows an MLL 2 with wedged layers 4 to be cut out.

The y-extension of the layered structure 7 within the ramp section 23 increases in the form of an error function. This is due to the sputter deposition with a straight edge 47 mask element 31. Such an error function-shaped ramp section 23 is advantageous as the inclination of the layers 4 changes in z-direction, so that, depending on the z-position of the slice, different wedge angles are available, i.e. MLLs 2 with different wedge angles can be sliced out or a single MLL 2 with varying wedge angles of the layers 4 along the x-coordinate can be sliced out, as intended in the present invention. The y-extension or height of the layered structure 7 in the error function-shaped ramp section 23 can be calculated as stated above under Eqn. (2).

The lens 2 is formed in such a way that the focal length for a particular wedge gradient of a particular layer 4 at a particular x-coordinate is such that the layers 4 of the lens 2, when extended as straight lines, would intersect the optic axis at a distance of twice the focal length from the lens 2. This allows to calculate the focal length as noted above under Eqn. (3).

By such a method a wedged MLL 2 can be produced in a simple way, which can be used with a broad bandwidth of different wavelengths of X-rays by merely adjusting the position of the MLL 2 in the x-z-plane. This can be done by a simple linear movement if the MLL 2 is suitably cut. Providing multiple MLLs 2 for different X-ray wavelengths and complicated rebuilding and calibrating every time a wavelength is changed can be avoided.

What is claimed is:

1. A method for producing a multilayer Laue lens, comprising:
   providing a lens blank comprising:
      a substrate element having a flat upper surface extending in a plane defined by orthogonal axes x, y, z, wherein x and z extend in the plane and y extends normal to the plane, and
      a layered structure deposited on the upper surface of the substrate element in such a way that at least two different materials are layered upon one another in an alternating manner, wherein the y-extension of the layered structure is constant along the x-axis and varies along the z-axis within a ramp section where the y-extension of the layered structure increases from a starting point, where first particles of material of the layered structure are deposited on the upper surface of the substrate element, to a saturation point, where a maximum y-extension of the layered structure is reached; and
   slicing a lens out of the lens blank by slicing through the ramp section in a way not parallel to the x- and z-axes.

2. The method according to claim 1, wherein the slicing a lens out of the lens blank comprises producing at least a first cut and a second cut opposite and spaced from the first cut.

3. The method according to claim 1, wherein a thickness of the sliced lens is constant.

4. The method according to claim 1, wherein a thickness of the sliced lens varies in the x-z-plane.

5. The method according to claim 1, wherein the sliced lens has a straight extension in the x-z-plane.

6. The method according to claim 1, wherein the sliced lens has a curved extension in the x-z-plane.

7. The method according to claim 1, wherein the x-z-extension of the sliced lens is adapted such that, when the lens is positioned in an X-ray beam of a certain wavelength and the wavelength is altered subsequently, both adjustment of the lens to a new wavelength and corresponding refocussing can be carried out simultaneously by a linear movement of the lens along a single straight line.

8. The method according to claim 1, wherein the lens blank is produced by a sputter deposition method.

9. The method according to claim 8, wherein the sputter deposition method comprises:
   providing the substrate element having the flat upper surface;
   positioning a particle source opposite the upper surface of the substrate element;
   positioning a mask element between the upper surface of the substrate element and the particle source, such that a straight edge of the mask element extends in parallel to the x-axis and spaced between the upper surface and the particle source along the y-axis; and
   depositing of particles of at least two different materials in an alternating manner, such that the deposited particles form a layered structure on the upper surface of the substrate element formed by the at least two different materials layered upon one another in an alternating manner.

10. The method according to claim 9, wherein the mask element is positioned in such a way that it partly blocks deposition of the particles from the particle source onto the upper surface of the substrate element, so that along the z-direction of the upper surface the mask causes a full shadow area where no particles are deposited, followed by a penumbra area where a limited amount of particles is deposited thereby forming the ramp section of the layered structure, followed by a full deposition area where a full amount of particles is deposited thereby forming a section of maximum y-extension of the layered structure.

11. The method according to claim 1, wherein the y-extension of the layered structure within the ramp section increases in a form of an error function.

12. The method according to claim 1, wherein the lens is formed in such a way that a focal length for a particular wedge gradient is such that the layers of the lens, when extended as straight lines, would intersect an optic axis at a distance of twice the focal length from the lens.

13. A multilayer Laue lens, produced from a lens blank comprising:
a substrate element having a flat upper surface extending in a plane defined by orthogonal axes x, y, z, wherein x and z extend in the plane and y extends normal to the plane, and
a layered structure deposited on the upper surface of the substrate element in such a way that at least two different materials are layered upon one another in an alternating manner, wherein the y-extension of the layered structure is constant along the x-axis and varies along the z-axis within a ramp section where the y-extension of the layered structure increases from a starting point, where first particles of material of the layered structure are deposited on the upper surface of the substrate element, to a saturation point, where a maximum y-extension of the layered structure is reached,
wherein the multilayer Laue lens is sliced from the lens blank through the ramp section in a way not parallel to the x- and z-axes.

14. The multilayer Laue lens of claim 13, wherein the sliced lens is a structure formed from at least a first cut and a second cut opposite and spaced from the first cut.

15. The multilayer Laue lens of claim 13, wherein a thickness of the sliced lens is constant.

16. The multilayer Laue lens of claim 13, wherein a thickness of the sliced lens varies in the x-z-plane.

17. The multilayer Laue lens of claim 13, wherein the sliced lens has a straight extension in the x-z-plane.

18. The multilayer Laue lens of claim 13, wherein the sliced lens has a curved extension in the x-z-plane.

19. The multilayer Laue lens of claim 13, wherein the x-z-extension of the sliced lens is adapted such that, when the lens is positioned in an X-ray beam of a certain wavelength and the wavelength is altered subsequently, both adjustment of the lens to a new wavelength and corresponding refocussing can be carried out simultaneously by a linear movement of the lens along a single straight line.

20. The multilayer Laue lens of claim 13, wherein the lens blank is produced by a sputter deposition.

21. The multilayer Laue lens of claim 13, wherein the y-extension of the layered structure within the ramp section increases in a form of an error function.

22. The multilayer Laue lens of claim 13, wherein the lens is formed in such a way that a focal length for a particular wedge gradient is such that the layers of the lens, when extended as straight lines, would intersect an optic axis at a distance of twice the focal length from the lens.

23. A system comprising the multilayer Laue lens of claim 13 and a fixing device for fixing the multilayer Laue lens relative to an X-ray beam, wherein the fixing device is formed such that a position of the multilayer Laue lens can be adjusted along a linear track.

24. A method for operating a system comprising a multilayer Laue lens, produced from a lens blank including:
a substrate element having a flat upper surface extending in a plane defined by orthogonal axes x, y, z, wherein x and z extend in the plane and y extends normal to the plane, and
a layered structure deposited on the upper surface of the substrate element in such a way that at least two different materials are layered upon one another in an alternating manner, wherein the y-extension of the layered structure is constant along the x-axis and varies along the z-axis within a ramp section where the y-extension of the layered structure increases from a starting point, where first particles of material of the layered structure are deposited on the upper surface of the substrate element, to a saturation point, where a maximum y-extension of the layered structure is reached,
wherein the multilayer Laue lens is sliced from the lens blank through the ramp section in a way not parallel to the x- and z-axes, and
a fixing device for fixing the multilayer Laue lens relative to an X-ray beam, wherein the fixing device is formed such that a position of the multilayer Laue lens can be adjusted along a linear track; and
the method comprising:
arranging the multilayer Laue lens arrangement relative to an X-ray beam of a certain wavelength such that the multilayer Laue lens is positioned in the X-ray beam;
altering the wavelength of the X-ray beam; and
simultaneously adjusting the lens to the altered wavelength and corresponding refocussing by a linear movement of the lens along the linear track.

* * * * *